(12) United States Patent
Eungard et al.

(10) Patent No.: US 12,240,716 B2
(45) Date of Patent: Mar. 4, 2025

(54) WIPER SEAL PAD SYSTEMS

(71) Applicant: ASSA ABLOY ENTRANCE SYSTEMS AB, Landskrona (SE)

(72) Inventors: William C. Eungard, Waterford, WI (US); John C. Vendette, Wauwatosa, WI (US); William Amundson, Pewaukee, WI (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 275 days.

(21) Appl. No.: 17/890,132

(22) Filed: Aug. 17, 2022

(65) Prior Publication Data

US 2024/0059510 A1 Feb. 22, 2024

(51) Int. Cl.
B65G 69/00 (2006.01)

(52) U.S. Cl.
CPC .................. B65G 69/008 (2013.01)

(58) Field of Classification Search
CPC ....................................................... B65G 69/008
See application file for complete search history.

(56) References Cited

U.S. PATENT DOCUMENTS

| | | |
|---|---|---|
| 370,207 A | 9/1887 | Negroponte |
| 2,337,948 A | 12/1943 | James |
| 2,704,574 A | 3/1955 | Etlar |
| 2,718,678 A | 9/1955 | Ramsay |
| 2,793,068 A | 5/1957 | Paul |
| 3,070,400 A | 12/1962 | Rivers |
| 3,181,205 A | 5/1965 | Frommelt et al. |
| 3,227,205 A | 1/1966 | Crosswell |
| 3,230,675 A | 1/1966 | Frommelt et al. |
| 3,286,417 A | 11/1966 | Dazzo |
| 3,375,625 A | 4/1968 | Edkins et al. |

(Continued)

FOREIGN PATENT DOCUMENTS

| | | |
|---|---|---|
| AU | 2006230657 A1 | 5/2007 |
| CA | 2607077 C | 2/2010 |

(Continued)

OTHER PUBLICATIONS

4Front Engineered Solutions, Inc., DSH Series Dock Seals Installation Instructions, Form No. 4F-DSH-1/07.

(Continued)

*Primary Examiner* — Patrick J Maestri
(74) *Attorney, Agent, or Firm* — Perkins Coie LLP (57) ABSTRACT

The present disclosure is directed generally to wiper seal pad systems for use at a loading dock station, which can include an elongate pad having a first side surface configured to face outwardly from the loading dock and contact an exterior surface of a trailer positioned at the loading dock, and a second side surface opposite the first side surface. The systems can further include a mounting member operably coupled to the upper surface, the first side surface, and/or the second side surface, and a hanger bracket having a base, a flange extending upwardly from the base, and a tab extending downwardly from the base. The flange can be configured to operably couple to the head member of the loading dock and the tab can be configured to operably couple to the mounting member, thereby attaching the elongate pad to the head member.

30 Claims, 6 Drawing Sheets

(56) References Cited

U.S. PATENT DOCUMENTS

| | | | |
|---|---|---|---|
| 3,403,489 | A | 10/1968 | Frommelt et al. |
| 3,453,019 | A | 7/1969 | Carr |
| 3,461,627 | A | 8/1969 | Conger |
| 3,500,599 | A | 3/1970 | Sciolino |
| 3,613,324 | A | 10/1971 | Conger |
| 3,875,954 | A | 4/1975 | Frommelt et al. |
| 4,015,380 | A | 4/1977 | Chalfant |
| 4,038,792 | A | 8/1977 | Mcguire et al. |
| 4,213,279 | A | 7/1980 | Layne |
| 4,286,410 | A | 9/1981 | Hahn |
| 4,293,969 | A | 10/1981 | Frommelt |
| 4,328,273 | A | 5/1982 | Yackiw |
| 4,346,929 | A | 8/1982 | Peters |
| 4,365,452 | A | 12/1982 | Fillman et al. |
| 4,381,631 | A | 5/1983 | Frommelt |
| 4,422,199 | A | 12/1983 | Frommelt |
| 4,525,953 | A | 7/1985 | Stutzman |
| 4,557,008 | A | 12/1985 | Jurden |
| 4,574,542 | A | 3/1986 | Kleynjans |
| 4,601,142 | A | 7/1986 | Frommelt |
| 4,636,423 | A | 1/1987 | Reid |
| 4,638,612 | A | 1/1987 | Bennett |
| 4,682,382 | A | 7/1987 | Bennett |
| 4,711,059 | A | 12/1987 | Layne |
| 4,716,697 | A | 1/1988 | Snyder |
| 4,718,207 | A | 1/1988 | Frommelt |
| 4,744,121 | A | 5/1988 | Swessel et al. |
| 4,799,342 | A | 1/1989 | Kleynjans |
| 4,805,362 | A | 2/1989 | Frommelt et al. |
| 4,821,468 | A | 4/1989 | Moore |
| 4,825,607 | A | 5/1989 | Frommelt et al. |
| 4,885,881 | A | 12/1989 | Lenz |
| 4,916,870 | A | 4/1990 | Moore |
| 5,001,799 | A | 3/1991 | Alexander et al. |
| 5,007,203 | A | 4/1991 | Katrynuik |
| 5,048,246 | A | 9/1991 | Sullivan |
| 5,088,143 | A | 2/1992 | Alexander |
| 5,125,196 | A | 6/1992 | Moody |
| 5,174,084 | A | 12/1992 | Alten |
| 5,185,977 | A | 2/1993 | Brockman et al. |
| 5,282,342 | A * | 2/1994 | Brockman ............ B65G 69/008 52/173.2 |
| 5,313,681 | A | 5/1994 | Alexander |
| 5,333,424 | A | 8/1994 | Chalfant et al. |
| 5,394,662 | A | 3/1995 | Giuliani et al. |
| 5,396,676 | A | 3/1995 | Alexander et al. |
| 5,442,825 | A | 8/1995 | Hahn et al. |
| 5,473,846 | A | 12/1995 | Giuliani et al. |
| 5,475,888 | A | 12/1995 | Massey |
| 5,475,946 | A | 12/1995 | Howe |
| 5,533,218 | A | 7/1996 | Fahy |
| 5,553,424 | A | 9/1996 | Brockman et al. |
| 5,622,016 | A | 4/1997 | Frommelt et al. |
| 5,675,945 | A | 10/1997 | Giuliani et al. |
| 5,775,044 | A | 7/1998 | Styba et al. |
| 5,953,868 | A | 9/1999 | Giuliani et al. |
| 5,996,291 | A | 12/1999 | Styba et al. |
| 6,014,844 | A | 1/2000 | Thill |
| 6,044,597 | A | 4/2000 | Droullard et al. |
| 6,073,402 | A | 6/2000 | Moody |
| 6,125,491 | A | 10/2000 | Alexander |
| 6,158,171 | A | 12/2000 | Kellogg et al. |
| 6,205,721 | B1 | 3/2001 | Ashelin et al. |
| 6,233,885 | B1 | 5/2001 | Hoffmann et al. |
| 6,311,435 | B1 | 11/2001 | Brockman et al. |
| 6,374,554 | B1 | 4/2002 | Eungard |
| 6,399,189 | B1 | 6/2002 | Kobayashi et al. |
| 6,425,214 | B1 | 7/2002 | Boffeli et al. |
| 6,442,783 | B1 | 9/2002 | Yoon et al. |
| 6,502,268 | B2 | 1/2003 | Ashelin et al. |
| 6,654,976 | B2 | 12/2003 | Digmann et al. |
| 6,810,817 | B1 | 11/2004 | James |
| 6,854,224 | B2 | 2/2005 | Thill et al. |
| 6,877,695 | B2 | 4/2005 | Eveker et al. |
| 6,948,285 | B2 | 9/2005 | Miller et al. |
| 7,044,474 | B2 | 5/2006 | Eungard |
| 7,146,673 | B1 | 12/2006 | Digmann et al. |
| 7,162,762 | B1 | 1/2007 | Gleason |
| 7,184,194 | B2 | 2/2007 | Wood |
| 7,230,819 | B2 | 6/2007 | Muchow et al. |
| 7,254,922 | B2 | 8/2007 | Brockman et al. |
| 7,287,353 | B2 | 10/2007 | Thill et al. |
| 7,334,281 | B2 | 2/2008 | Digmann et al. |
| 7,380,375 | B2 | 6/2008 | Maly |
| 7,383,664 | B2 * | 6/2008 | Chalfant ............ B65G 69/008 52/173.1 |
| 7,444,785 | B2 | 11/2008 | Dillon et al. |
| 7,584,517 | B2 | 9/2009 | Digmann et al. |
| 7,695,048 | B2 | 4/2010 | Hoffman |
| 7,703,245 | B2 | 4/2010 | Chalfant |
| 7,757,442 | B2 | 7/2010 | Hoffmann et al. |
| 7,781,292 | B2 | 8/2010 | Gambino et al. |
| 7,861,762 | B2 | 1/2011 | Meichtry |
| 7,877,831 | B2 | 2/2011 | Digmann et al. |
| 7,891,400 | B2 | 2/2011 | Meichtry |
| 8,037,576 | B2 | 10/2011 | Meichtry |
| 8,112,949 | B2 | 2/2012 | Eungard |
| 8,132,280 | B2 | 3/2012 | Gleason et al. |
| 8,181,401 | B2 | 5/2012 | Eungard |
| 8,307,589 | B2 | 11/2012 | Eungard |
| 9,003,725 | B2 | 4/2015 | Digmann et al. |
| 2002/0148177 | A1 | 10/2002 | Dibiase |
| 2003/0177720 | A1 | 9/2003 | Hoffmann et al. |
| 2003/0230033 | A1 | 12/2003 | Shelton |
| 2004/0123532 | A1 | 7/2004 | Thill et al. |
| 2004/0134139 | A1 | 7/2004 | Busch et al. |
| 2004/0261335 | A1 | 12/2004 | Eungard |
| 2005/0102929 | A1 | 5/2005 | Hoffmann et al. |
| 2005/0178077 | A1 | 8/2005 | Shelton |
| 2006/0026912 | A1 | 2/2006 | Eungard et al. |
| 2006/0032159 | A1 | 2/2006 | Eungard et al. |
| 2006/0090407 | A1 | 5/2006 | Hoffmann et al. |
| 2007/0101517 | A1 | 5/2007 | Digmann et al. |
| 2007/0101518 | A1 | 5/2007 | Digmann et al. |
| 2008/0034683 | A1 | 2/2008 | Hoffmann |
| 2008/0047211 | A1 | 2/2008 | Hoffmann et al. |
| 2008/0052843 | A1 | 3/2008 | Eungard et al. |
| 2008/0104902 | A1 | 5/2008 | Ashelin et al. |
| 2008/0289270 | A1 | 11/2008 | Chalfant |
| 2009/0044453 | A1 | 2/2009 | Meichtry |
| 2009/0044454 | A1 | 2/2009 | Meichtry |
| 2009/0044917 | A1 | 2/2009 | Meichtry |
| 2009/0045649 | A1 | 2/2009 | Eungard et al. |
| 2009/0064605 | A1 | 3/2009 | Hoffman |
| 2009/0077906 | A1 | 3/2009 | Tramonte et al. |
| 2009/0133339 | A1 | 5/2009 | Carolan et al. |
| 2009/0293382 | A1 | 12/2009 | Digmann et al. |
| 2010/0031457 | A1 | 2/2010 | Gleason et al. |
| 2010/0186318 | A1 | 7/2010 | Eungard |
| 2010/0251639 | A1 | 10/2010 | Hoffmann et al. |
| 2010/0269427 | A1 | 10/2010 | Digmann et al. |
| 2010/0319143 | A1 | 12/2010 | Wessel |

FOREIGN PATENT DOCUMENTS

| | | |
|---|---|---|
| EP | 0173929 A2 | 3/1986 |
| EP | 0477656 A1 | 4/1992 |
| EP | 0698515 A2 | 2/1996 |
| GB | 2033456 A | 5/1980 |
| WO | 9410073 A1 | 5/1994 |
| WO | 0027734 A1 | 5/2000 |
| WO | 2006052661 A2 | 5/2006 |
| WO | 2007056744 A1 | 5/2007 |
| WO | 2007076507 A2 | 7/2007 |
| WO | 2008021696 A2 | 2/2008 |
| WO | 2008057682 A2 | 5/2008 |
| WO | 2009032441 A1 | 3/2009 |

OTHER PUBLICATIONS

4Front Engineered Solutions, Inc., DSHL Series Dock Seals Installation Instructions, Form No. 4F-DSHL-1/07.

(56) References Cited

OTHER PUBLICATIONS

4Front Engineered Solutions, Inc., DSS & WM Series Dock Seals Installation Instructions, Form No. 4F-DSS-1/07.

4Front Engineered Solutions, Inc., Rear Hinge Installation Pub. No. AP5525 RA p. 3, Jun. 2011, 1 pg.

4Front Engineered Solutions, Inc., VSH Series Dock Seals Installation Instructions, Form No. 4F-VSH-1/07.

Dock Leveler Weatherseals, Rite Hite Corp., 2008, 3 pgs.

Drawings No. 707-312 Rear Hinge w/s Assembly, Kelley Company, Inc., Nov. 15, 2008.

Frommelt Eliminator II Series Soft-Sided Shelters, Frommelt Products Corporation, 6 pages, 2002.

Frommelt Insulator Dock Sealing System, Frommelt Products Corporation, 4 pages, 2001.

Frommelt PitMaster Under-Leveler Seal, Rite Hite Corp., 2008, 2 pgs.

Frommelt VHL Under Leveler Seal (Model VHLS), Architectural Specifications, date unknown, 2 pgs.

Frommelt VHLS Under-Leveler Seal for Vertical Hydraulic Leveler, Rite-Hite Holding Corporation, 1 pg. [Internet accessed Aug. 28, 2007].

Frommelt VHLS Vertical Under-Leveler Seal Installation Instructions, Frommelt Products Corporation, Pub. No. VHLS-0003, May 2007, 16 pgs.

Kelley aFX/aFX-S Dock Leveler Safe T Frame, User's Manual, Installation, Operations, Maintenance and Parts, 4Front Engineered Solutions, Inc., 2008.

Kelley DSS Series Dock Seal With Stationary Head Pad, Kelley Dock Seals, 4Front Engineered Solutions 2007.

Kelley Weatherseal Installation Instructions '4 Series' Dockboard, Kelley Company, Inc., Doc. No. 5164, 2 pages, Mar. 2, 1981.

Series 1600 WeatherGuard Header Seals, Fairborn USA Inc., 2 pages, 2004.

\* cited by examiner

WIPER SEAL PAD SYSTEMS

TECHNICAL FIELD

The present disclosure is directed generally wiper seal pad assemblies and, more particularly, to wiper seal pad assemblies for use with a trailer at a loading dock station.

BACKGROUND

Vehicle docking facilities, such as warehouses, typically include multiple vehicle docking stations that facilitate the movement of goods between the facility and a vehicle parked at the docking station. Each vehicle docking station can include docking equipment used to improve the safety and efficiency of moving goods between the facility and the vehicle. A vehicle docking station can include, for example, a vehicle restraint used to ensure that the vehicle does not move away from the docking station during loading and unloading, a dock door used to control access into and out of the warehouse, a dock leveler used to provide a bridge or ramp between the vehicle and the facility, a barrier gate to prevent cargo or personnel from falling out of the docking station when the dock door is open, and/or a shelter to provide cover between the vehicle and the facility during loading and unloading.

A typical loading dock door opening will be larger than the opening in the trailer to account for variations in size and parked position of the trailer. In this regard, sealing components can be used in conjunction with the shelter and can be positioned to at least partially surround the loading dock door (e.g., the sides and/or top) to partially or fully enclose the gap spaces between the trailer and the facility. The enclosure of the gap spaces by the sealing components can reduce air transfer between the exterior and interior of the facility to improve efficiency of the climate control system within the facility, prevent water ingress during inclement weather, minimize contaminant and allergen ingress into the facility, etc. Seals that contact the trailer to more thoroughly enclose the gap spaces around the loading dock door typically include features to allow sealing of various sizes and positions of the trailer with respect to the loading dock door opening.

DETAILED DESCRIPTION

The following disclosure describes various embodiments of systems and methods for at least partially sealing door openings at a loading dock station. In some embodiments, wiper seal pad systems described herein may include systems positioned proximate the loading dock door opening and suitable for interfacing with a trailer parked at the loading dock station. Systems configured in accordance with the present technology may include a wiper seal pad that includes a mounting member and a hanger bracket configured to operably couple the wiper seal pad to a head member of the loading dock station. The wiper seal pad can be positioned for contact with a top of the trailer to seal the gap between the top of the trailer and the top of the loading dock door opening, reducing air transfer between the exterior and interior of the loading dock facility. Some embodiments of the wiper seal pads described herein can include front and back surfaces that are disposed at an angle relative to each other such that the wiper seal pad has a cross-sectional shape that tapers inwardly extending away from the top surface of the wiper seal pad. Embodiments of the wiper seal pad can further include two pad portions in a stacked configuration, with an upper portion having a first more rigid (or substantially rigid) foam and a lower portion having an a second more resilient foam (e.g., an elastomeric foam). In some embodiments, the hanger brackets can be operably coupled to a crossmember of the head member of the loading dock by various suitable means including, e.g., clinching, fastening, welding, bonding, etc.

Certain details are set forth in the following description and in FIGS. 1-5C to provide a thorough understanding of various embodiments of the present technology. In other instances, well-known structures, systems, materials and/or operations often associated with loading docks, trailer door systems and associated components are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present invention. Those of ordinary skill in the art will also appreciate that further embodiments of the invention can be practiced without several of the details described below. In the Figures, identical reference numbers identify identical, or at least generally similar, elements.

Figure 1:
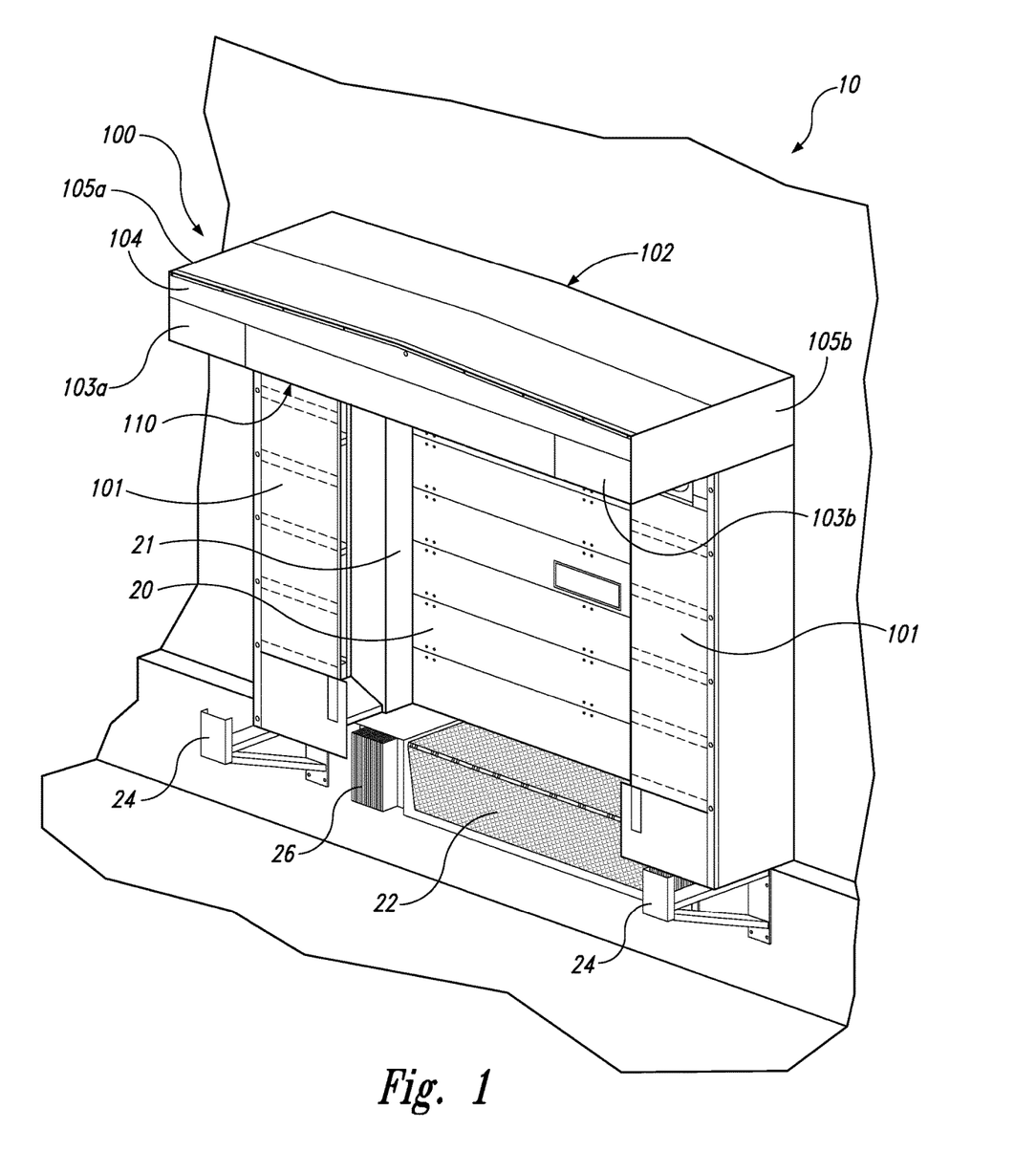
FIG. 1 is a perspective view of a vehicle loading dock station having a dock shelter assembly with a wiper seal pad assembly configured in accordance with embodiments of the present technology.

FIG. 1 is a perspective view of a vehicle loading dock station 10 ("station 10") having a dock shelter assembly 100 with an elongate wiper seal pad assembly 110 ("pad assembly 110") configured in accordance with embodiments of the present technology. The station 10 includes a loading dock door 20 that, when raised, uncovers a door opening 21 through which goods can be loaded and unloaded from a trailer (not shown) parked at the station 10 in a conventional manner. In some embodiments the station 10 can further include a dock leveler 22 to accommodate various heights in the trailer floor surfaces, protective steel guards 24 to prevent damage to the components of the station 10 and the dock shelter assembly 100, and dock bumpers 26 configured to contact the trailer and set the spacing of the trailer to the trailer door 20 and/or prevent impact of the trailer against the loading dock door 20 or other components of the station 10. Although one embodiment of a loading dock station is shown in the Figures, the embodiments of the wiper seal pad assemblies described herein are suitable for use with other configurations of loading dock stations. Accordingly, it will be understood that the wiper seal pad assemblies disclosed herein and the various components and subassemblies associated therewith are not limited to use with any particular configuration of loading dock station unless the context clearly requires otherwise.

In some embodiments, the dock shelter assembly 100 is configured to at least partially seal the gaps between the trailer and the loading dock door opening 21 when the trailer is parked at the station 10 to reduce air transfer between the exterior and the interior of the station 10. The sides of the trailer can be at least partially sealed by compressible side curtains 101 positioned on either side of the dock shelter assembly 100 and that are configured to interface with the sides of the trailer. The side curtains 101 can be, e.g., at least partially compressible and/or otherwise configured to accommodate different parked positions of the trailer with respect to the dock shelter assembly 100, e.g., with flexible members, hinges, inflatable portions, foam portions, etc. In some embodiments, the dock shelter assembly 100 can further include a head frame assembly 102 positioned above the loading dock door 20. The head frame assembly 102 can protrude a distance (e.g., from 6 inches to 48 inches, or greater) from the wall of the station 10 to provide cover over the opening 21 of the loading dock door 20, the leveler 22, and the gap between the trailer and loading door opening 21, and protect the open area and other components of the station 10 from rain, sun, dust, etc. In other embodiments, a head frame assembly (e.g., the head frame assembly 102) or other frame assembly can be attached to the loading dock without the shelter assembly 100, such as in configurations of a loading dock where the pad assembly 110 is used without a shelter assembly 100. In these embodiments, the pad assembly 110 can be operably coupled directly to the station 10 above the loading dock door 20 and configured to interface with the trailer without the full dock shelter assembly 100.

The head frame assembly 102 can include front lateral panels 103a and 103b, a front head frame member 104, and side head frame members 105a and 105b (with the side head frame member 105a positioned on the opposite side of the head frame assembly 102 from the side head frame member 105b). In some embodiments, the front lateral panel 103a and the side head frame member 105a can be a continuous piece, and the front lateral panel 103b and the side head frame member 105b can be a continuous piece. In the illustrated embodiment, the pad assembly 110 can be operably coupled to the head frame assembly 102, as will be described in detail below with reference to FIGS. 2A and 2B. The front lateral panels 103a and 103b can be positioned on either side of the pad assembly 110 and configured to remain stationary as the pad assembly 110 is deflected and/or deformed during interaction with the top of the trailer, as will be described in detail below with reference to FIGS. 4 and 5A-5C. In other embodiments, the head frame assembly 102 can include additional components to cover portions of the station 10 and/or permit interaction between the pad assembly 110 and the top of the trailer. In yet further embodiments, one or more of the components of the head frame assembly 102 described above may be omitted and/or individual components may be combined into a single component.

Figure 2A:
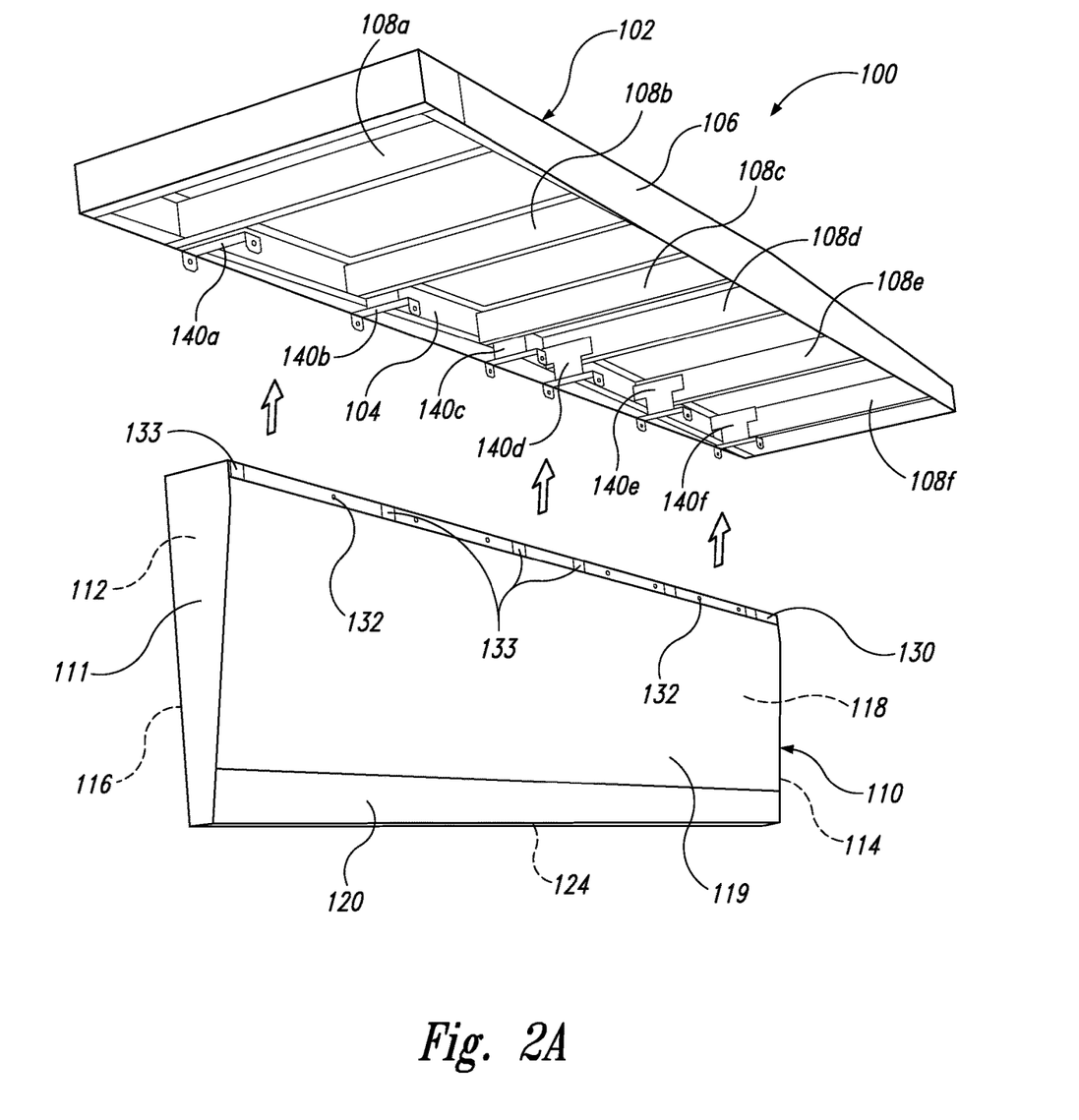
FIGS. 2A and 2B are perspective exploded and assembled views, respectively, of a head frame assembly and a wiper seal pad assembly configured in accordance with embodiments of the present technology.
Figure 2B:
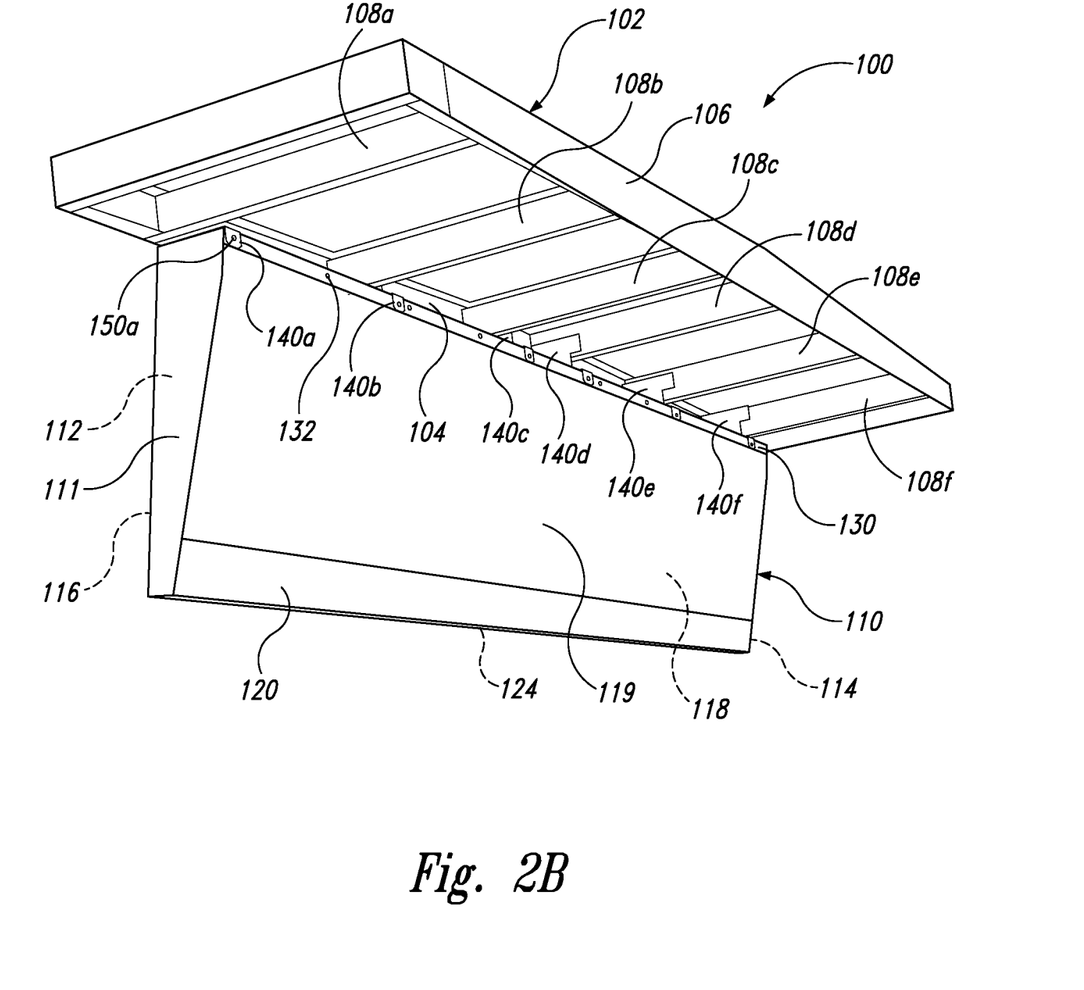

FIGS. 2A and 2B are rear perspective exploded and assembled views, respectively, of the head frame assembly 102 and the pad assembly 110, with the front lateral panels 103a and 103b and the side head frame members 105a and 105b omitted for clarity. The head frame assembly 102 can further include a rear head frame member 106 configured to abut the wall of the station 10, and a plurality of crossmembers 108a-108f (referred to collectively as crossmembers 108) extending longitudinally and perpendicularly between the front and rear head frame members 104 and 106 and attached thereto. Although the crossmembers 108 are illustrated as L-angle beams, other embodiments of the crossmembers can be any suitable beam shape, such as I-beam, C-channel, T-bar, rectangle bar, etc. Similarly, although the Figures show six crossmembers 108a-108f, any suitable number of crossmembers 108, including no crossmembers 108, is within the scope of embodiments of the present technology. In some embodiments, the head frame assembly 102 can also include a plurality of hanger brackets 140a-140e operably coupled to the corresponding crossmembers 108a-108e for mounting the pad assembly 110, as will be described in detail below.

The pad assembly 110 can include an elongate pad 111 ("pad 111"). In some embodiments, the pad 111 can have a first lateral surface 112 and an opposite second lateral surface 114, a first or front side surface 116 and a second or rear side surface 118, and an upper surface 122 (see FIG. 4) and a lower surface 124. As will be described below with reference to FIG. 4, the pad assembly 110 can include a base cover 119 and a removable protective cover 120 to protect the material of the pad assembly 110 from wear during contact with the trailer as the trailer approaches the station 10 in a driving direction DD. The first side surface 116 (e.g., facing forward/outward from the station 10) extends downwardly from the upper surface 122 and is configured to face outwardly from the station 10 and contact an exterior surface of the trailer during positioning and parking at the loading dock. The second side surface 118 (e.g., facing rearward/toward the station 10) extends downwardly from the upper surface 122 opposite the first side surface 116 such that the pad 111 has a cross-sectional shape that tapers inwardly extending away from the upper surface 122. In some of these embodiments, the first side surface 116 can be perpendicular, or at least substantially perpendicular) to a ground surface in front of the loading dock station and the second side surface 118 can be disposed at an angle relative to the first side surface 116 from about 5° to about 18°, from about 8° to about 15°, from about 10° to about 13°, from about 11° to about 12°, or from 11° to 12° inclusive. In other embodiments, the first and second side surfaces 116 and 118 can instead be substantially parallel to each other such that the pad 111 does not have an inward taper extending away from the upper surface 122. In yet other embodiments, the pad 111 can taper outwardly extending away from the upper surface 122.

The pad assembly 110 can include a mounting member 130 (e.g., an elongate mounting member) operably coupled to at least a portion of at least one of the upper surface 122, the first side surface 116 directly adjacent to the upper surface 122, and/or the second side surface 118 directly adjacent to the upper surface 122. In some embodiments, at least the upper surface 122 of the pad 111 can be operably coupled to the mounting member 130 by an adhesive or other suitable bonding method, material, and/or mechanism. The mounting member 130 can operably couple the pad assembly 110 to the head frame assembly 102 as shown in FIG. 2B. For example, as shown in FIG. 2A, in some embodiments, the mounting member 130 can include a plurality of marked fastener target locations 132 configured to indicate a recommended location for installing fasteners (e.g., self-tapping fasteners (not shown in FIGS. 2A and 2B), see also FIG. 3) which extend therethrough and into the pad 111. The fastener target locations 132 can provide guidance for manufacturing personnel during assembly of the pad assembly 110 by marking locations where protruding heads of the fasteners will not interfere with operably coupling the pad assembly 110 to the head frame assembly 102. In some embodiments, the fastener target locations 132 can be painted, marked, etched, scribed, indented, or otherwise indicated on the mounting member 130, or can be included as apertures through the mounting member 130 configured to receive, e.g., a self-tapping or non-self-tapping fastener, or other suitable fastener. In these embodiments, the fasteners can extend partially into the pad 111.

In some embodiments and as shown in FIG. 2A, the mounting member 130 can further include target sections 133 configured to align with a mounting or hanger bracket 140 (see, e.g., FIG. 3) when the pad assembly 110 is operably coupled to the head frame assembly 102. In these embodiments, the target sections 133 can indicate to an installer where the hanger bracket 140 will be positioned when the pad assembly 110 is operably coupled to the head frame assembly 102. In this regard, the installer can insert fasteners 151 (see FIG. 3) through apertures 150a and 150b and through the mounting member 130. The fasteners 151 can be self-tapping fasteners to extend through the mounting member 130 and operably couple the pad assembly 110 to the head frame assembly 102, or the mounting member 130 can include apertures (not shown) configured to align with the apertures 150a and 150b and receive a fastener therethrough to operably couple the pad assembly 110 to the head frame assembly 102. In these embodiments, different spacings of the crossmembers 108, and thereby different spacings of the hanger brackets 140 attached thereto, can be accommodated by moving the fastener target locations 132 and/or the target sections 133 of the mounting member 130. For example, the number and/or spacing of the fastener target locations 132 and the target sections 133 can accommodate different spacing or quantity of the crossmembers 108, fastening requirements between the mounting member 130 and the pad 110, etc.

Figure 3:
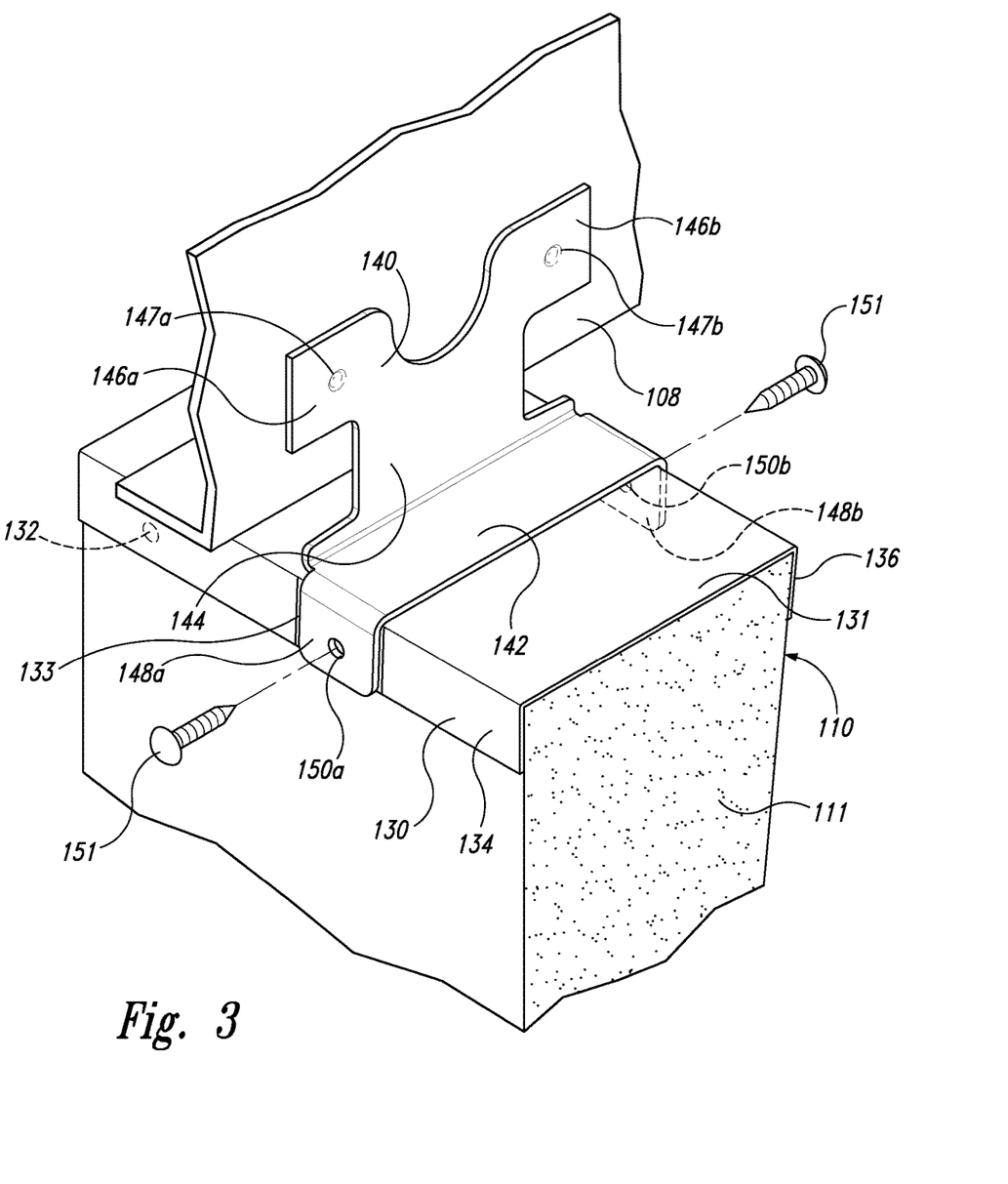
FIG. 3 is a perspective view of a hanger bracket of the head frame assembly of FIGS. 2A and 2B.
Figure 4:
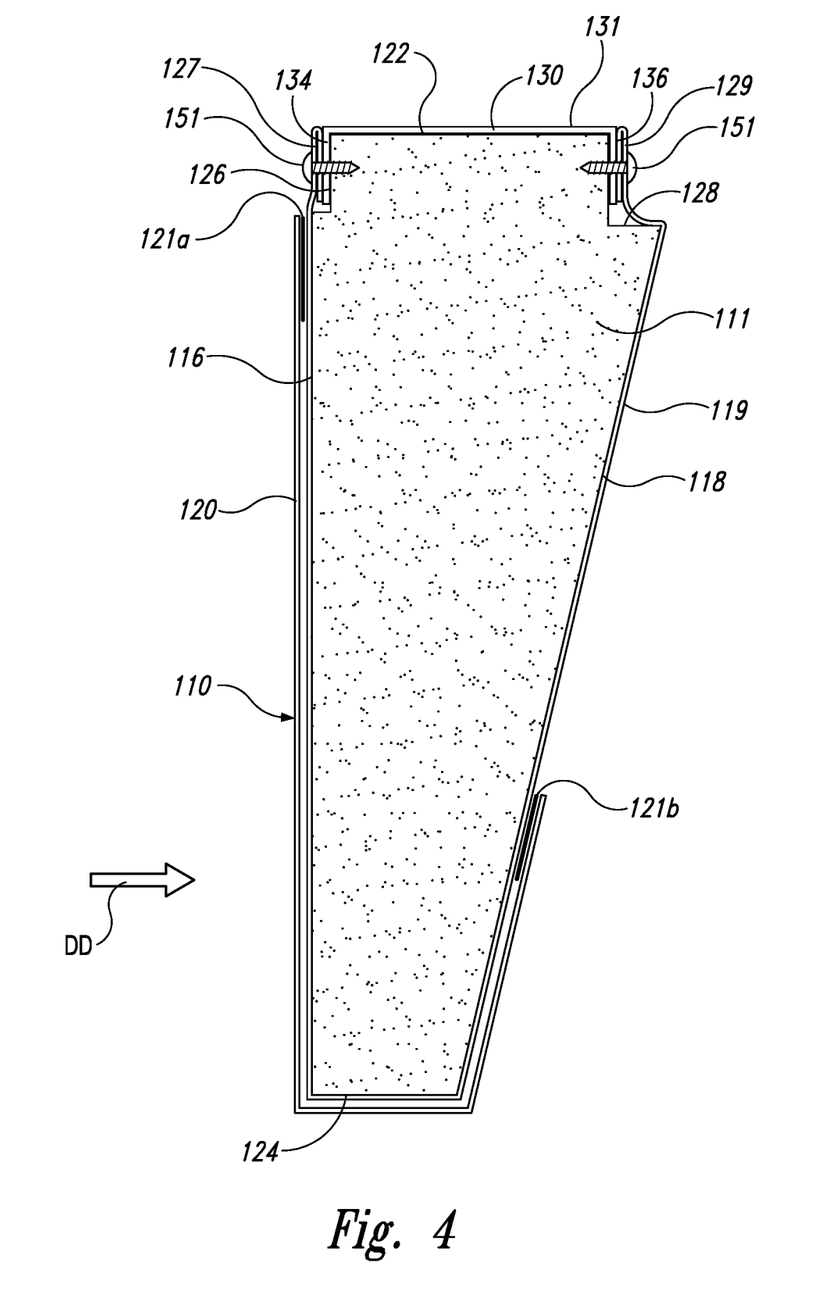
FIG. 4 is a cross-sectional side view of a wiper seal pad assembly configured in accordance with embodiments of the present technology.

In some embodiments, the mounting member 130 can be a channel, (e.g., a C-channel of steel, aluminum, carbon fiber, fiberglass, etc.), having a central web portion 131 configured to bond with the upper surface 122, a first flange 134 projecting downwardly from one edge of the central web portion 131, and a second flange 136 projecting downwardly from the opposite edge of the central web portion 131 (see FIGS. 3 and 4). In these embodiments, the first flange 134 is configured to interface with the first side surface 116 and the second flange 136 is configured to interface with the second side surface 118, and either or both of the first and second flanges 134 and 136 can be bonded to the pad 111 in addition to the central web portion 131. Referring briefly to FIG. 4, the pad 110 can include a first notch 126 inset from the first side surface 116 and extending downwardly from the upper surface 122, and can include a second notch 128 inset from the second side surface 118 and extending downwardly from the upper surface 122, with each of the first and second notches 126 and 128 configured to receive the first and second flanges 134 and 136 therein, respectively. In this regard, the overall width of the mounting member 130 from the first flange 134 to the second flange 136 can be less than the overall width of the pad 111 between the first side surface 116 on the second side surface 118. The notches 126 and 128 can allow a wider body of the pad 111 (e.g., below the notches 126 and 128) in relation to the width of the mounting member for improved durability, improve the finished look of the installation of the pad, minimize material of the mounting member, etc. In some embodiments, only one of the first and second notches 126 and 128 are included in the pad 111, and in further embodiments no notches are included the pad 111 (see, e.g., FIG. 3).

Further embodiments of the mounting member 130 can omit the central web portion 131 such that the first and second flanges 134 and 136 are flat bars that extend along the first and second side surfaces 116 and 118, respectively, to provide reinforcement for mounting the pad assembly 110 to the hanger brackets 140. In other embodiments, the mounting member 130 can be a plank or board, (e.g., wood, fiberglass, etc., not shown), or other suitable configuration for operably coupling the pad 110 to the hanger brackets 140. In further embodiments, the plank or board can be operably coupled to the upper surface (e.g., bonded) and the mounting member 130 can be a C-channel operably coupled to the plank or board to attach the pad assembly 110 to the head frame assembly 102.

FIG. 3 is a top perspective view of one of the hanger brackets 140 of the head frame assembly 102 shown in an example mounting configuration with the hanger bracket 140 operably coupling the pad assembly 110 to the crossmember 108. The hanger bracket 140 can include a base 142, a flange 144 extending upwardly from the base 142, and first and second tabs 148a and 148b extending downwardly from the base 142. The flange 144 can extend upwardly perpendicular to the base 142 and include a first ear portion 146a and a second ear portion 146b extending laterally from the flange 144. The first and second ear portions 146a and 146b can be configured to operably couple the hanger bracket 140 to the crossmember 108, e.g., with clinching features 147a and 147b, respectively (e.g., metal clinching). In other embodiments, the first and second ear portions 146a and 146b can include apertures to receive a fastener therethrough, can be welded to the crossmember 108, can be bonded to the crossmember 108, or any other suitable coupling configuration, or the first and second ear portions 146a and 146b may be omitted such that the flange 144 is directly operably coupled to the crossmember 108.

The first and second tabs 148a and 148b of the hanger bracket 140 can extend downwardly perpendicular from the base 142 and are configured to receive the fasteners 151 that extend therethrough and then through the mounting member 130 to operably couple the hanger bracket 140 to the pad 111. In some embodiments, the fasteners 151 are self-tapping screws, nails, expanding anchors, etc., that extend partially thought the pad 111. In other embodiments, the fasteners 151 can be the fasteners can be, e.g., bolts (not shown) that extend completely through the pad 111 both the apertures 150a and 150b and receive, e.g., a nut (not shown) to fasten the components together. The hanger brackets 140 can be made from, e.g., stamped and formed sheet-metal, casting, forging, or other suitable manufacturing method, or can be an assembly of components. In other embodiments, the hanger brackets 140 can be integral to the crossmembers 108 of the head frame assembly 102.

FIG. 4 is a cross-sectional side view of the pad 110 configured in accordance with embodiments of the present technology. The pad assembly 110 can include the base cover 119 operably coupled to the mounting member 130. In the illustrated embodiment, the protective wear cover 120 overlays at least a portion of the base cover 119 on the first side surface 116 and wraps around lower surface 124 and overlays at least a portion of the base cover 119 on the second side surface 118. The wear cover 120 can be configured to contact the exterior surface of the trailer as the trailer approaches the station 10. The base cover 119 can be coupled to the first flange 134 at a first hem 127 by the fasteners 151 and to the second flange 136 at a second hem 129 by the fasteners 151. The base cover 119 can be configured to cover the first side surface 116, the second side surface 118, the lower surface 124, and the first and second lateral surfaces 112 and 114 to protect the material of the pad 111 during use. The wear cover 120 can be operably coupled to the base cover 119 by a first patch 121a on the first side surface 116, and a second patch 121b on the second side surface 118. In some embodiments, the first and second patches 121a and 121b are hook and loop fasteners such that the wear cover 120 can be readily replaced if worn; however, in other embodiments, the first and second patches 121a and 121b can be removably bonded, or otherwise fastened with screws, clips, hooks, nails, or the like. In further embodiments, the base cover 119 and/or the wear cover 120 can be omitted or integral with the pad 111.

Figure 5A:
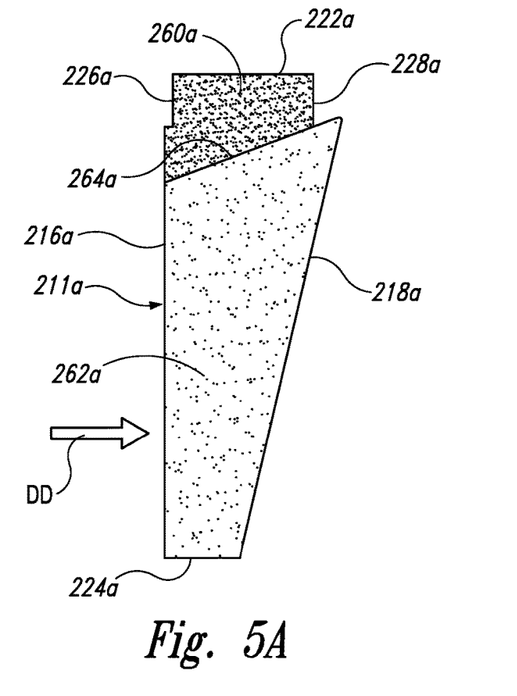
FIGS. 5A-5C are cross-sectional side views of a wiper seal pad configured in accordance with other embodiments of the present technology.
Figure 5B:
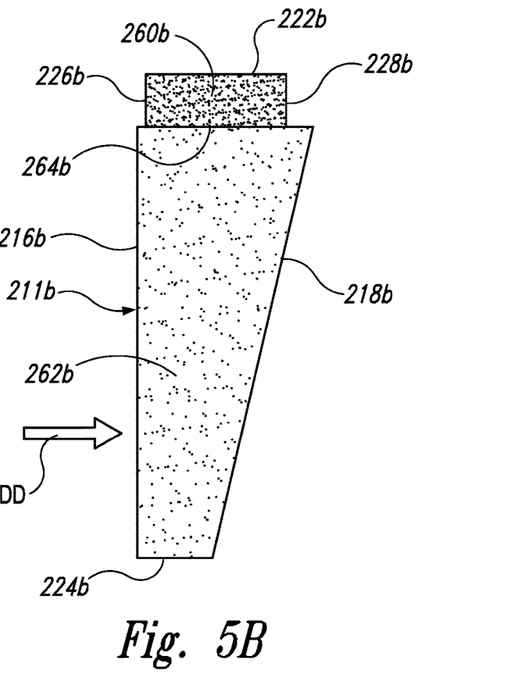
Figure 5C:
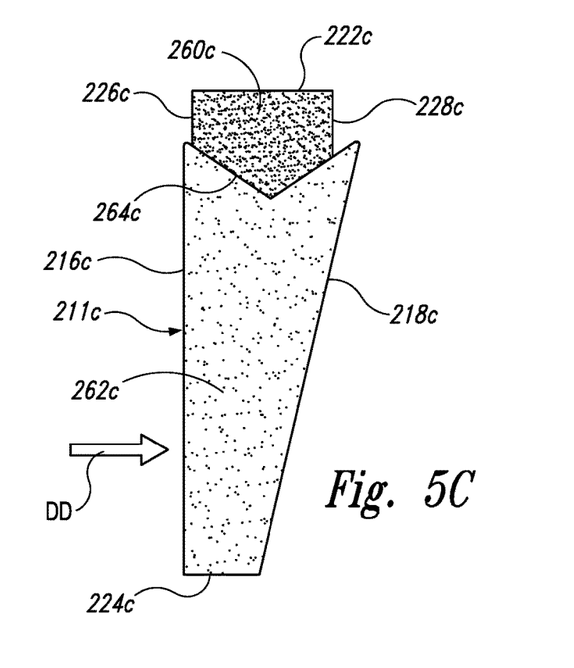

FIGS. 5A-5C are cross-sectional side views of wiper seal pads 211a, 211b, and 211c, respectively, with each of the assemblies configured in accordance with further embodiments of the present technology. The wiper seal pads 211a-211c ("pads 211a-211c") are similar to the configuration of the pad 111 shown in FIG. 4, except that the pads 211a-211c include multiple pad portions with a joint therebetween. In this respect, like numerals shown in the 200-series for the embodiments in FIGS. 5A-5C correspond to similar components of the embodiments of the pad 111 shown in FIGS. 2A-4. Turning first to FIG. 5A, the pad 211a can include a first pad portion 260a having an upper surface 222a and a second pad portion 262a positioned downward from the first pad portion 260a. The first and second pad portions 260a and 262a can be operably coupled at a joint 264a, e.g., by bonding or other suitable methods known in the art. In some embodiments, the joint 264a can be positioned at an acute angle relative to the upper surface 222a and extend from the second notch 228a to a first side surface 216a. The acute angle of the joint 264a can be from about 10° to about 45°, or about 25°.

The configuration of the joint 264a can increase the durability of the pad 211a during deformation from contact with the surface of the trailer. For example, as the trailer approaches the loading dock station in the driving direction DD, the trailer contacts first side surface 216a and deforms the pad 211a inward toward the loading dock door 20. Once the loading dock operations are complete, the trailer travels opposite of the driving direction DD to leave the loading dock station and operably pulls the pad 211a away from the loading dock door 20. During this movement of the pad 211a, the second pad portion 262a can be configured to deform with respect to the first pad portion 260a and return to the normal position as shown in FIG. 5A. In some embodiments, the first pad portion 260a can be a rigid, or at least partially rigid, material, e.g., an expanded polystyrene foam, wood, or similar material, and the second pad portion 262a can be an elastomeric material, e.g., a polyurethane foam or similar material. The embodiments of the pad 211a having the first pad portion 260a and the second pad portion 262a can increase the effective length of the pad, e.g., when mounting the pad higher with respect to the loading dock door 20 (e.g., when using a shelter assembly) than some conventional pad installations. In this regard, the force of the pad 211a on the trailer during use is increased by the inclusion of the rigid/partially rigid first pad portion 260a, creating an improved seal against the trailer, as opposed to a pad configuration using only the elastomeric material of the second pad portion 262a for the full length of the pad. Although the multiple pad portion configurations of FIGS. 5A-5C are shown with respect to the wiper seal location generally positioned above the loading dock door 20, in other embodiments the multiple pad portion configurations are suitable for use with the compressible side curtains 101.

The pads 211b (FIG. 5B) and 211c (FIG. 5C) have similar configurations to the pad 211a except with respect to the joint 264a. As shown in FIG. 5B, the pad 211b includes a joint 264b that is parallel with the upper surface 222b and extends from the first notch 226b to the second notch 228b. As shown in FIG. 5C, the pad 211c includes a joint 264c that is V-shaped and extends from the first notch 226c to the second notch 228c. Although several variations of the joints 264 are shown in FIGS. 5A-5C, other joint configurations are within the scope of the present technology, including, e.g., curved, notched, etc.

Unless the disclosure clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges. As used herein, the terms "about," "approximately," "near," etc., mean plus or minus 10% of the stated value unless otherwise noted.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A wiper seal pad assembly for use with a loading dock, the loading dock having a head frame positioned above a loading dock door, the wiper seal pad assembly comprising:
    an elongate pad having—
        a first pad portion having an upper surface;
        a second pad portion positioned at least partially beneath the first pad portion and operably coupled to the first pad portion at a joint, wherein the first pad portion comprises a first foam and the second pad portion comprises a second foam that is more resilient than the first foam;
        a first side surface extending downwardly relative to the upper surface, the first side surface configured to face outwardly from the loading dock and contact an exterior surface of a trailer positioned at the loading dock; and
        a second side surface extending downwardly relative to the upper surface opposite the first side surface; and
    a mounting member operably coupled to at least one of the upper surface or a portion of the first pad portion directly adjacent to the upper surface, wherein the mounting member is configured to operably couple the elongate pad to the head frame of the loading dock.

2. The wiper seal pad assembly of claim 1, wherein the elongate pad further includes a lower surface opposite the upper surface.

3. A wiper seal pad assembly for use with a loading dock, the loading dock having a head frame positioned above a loading dock door, the wiper seal pad assembly comprising:
    an elongate pad having—
        a first pad portion having an upper surface;
        a second pad portion positioned at least partially beneath the first pad portion and operably coupled to the first pad portion at a joint;
        a first side surface extending downwardly relative to the upper surface, the first side surface configured to face outwardly from the loading dock and contact an exterior surface of a trailer positioned at the loading dock; and
        a second side surface extending downwardly relative to the upper surface opposite the first side surface; and
    a mounting member operably coupled to at least one of the upper surface or a portion of the first pad portion directly adjacent to the upper surface, wherein the mounting member is configured to operably couple the elongate pad to the head frame of the loading dock, and wherein the elongate pad has a notch inset from at least one of the first side surface or the second side surface and extending downwardly from the upper surface along a portion of the elongate pad.

4. The wiper seal pad assembly of claim 1, wherein the second side surface is disposed at an angle relative to the first side surface such that the elongate pad has a cross-sectional shape that tapers inwardly extending away from the upper surface.

5. The wiper seal pad assembly of claim 1, wherein the joint is positioned at an acute angle relative to the upper surface.

6. A wiper seal pad assembly for use with a loading dock, the loading dock having a head frame positioned above a loading dock door, the wiper seal pad assembly comprising:
    an elongate pad having—
        a first pad portion having an upper surface;
        a second pad portion positioned at least partially beneath the first pad portion and operably coupled to the first pad portion at a joint, wherein the joint is V-shaped;
        a first side surface extending downwardly relative to the upper surface, the first side surface configured to face outwardly from the loading dock and contact an exterior surface of a trailer positioned at the loading dock; and
        a second side surface extending downwardly relative to the upper surface opposite the first side surface; and
    a mounting member operably coupled to at least one of the upper surface or a portion of the first pad portion directly adjacent to the upper surface, wherein the mounting member is configured to operably couple the elongate pad to the head frame of the loading dock.

7. The wiper seal pad assembly of claim 6, wherein the first pad portion comprises a first foam and the second pad portion comprises a second foam that is more resilient than the first foam.

8. The wiper seal pad assembly of claim 1, wherein the first foam is an expanded polystyrene foam and the second foam is a polyurethane foam.

9. The wiper seal pad assembly of claim 3, wherein the mounting member comprises:
    a steel channel having a central web portion;
    a flange projecting from the web portion and configured to extend at least partially in the notch.

10. The wiper seal pad assembly of claim 9, wherein the flange is a first flange, and wherein the mounting member further comprises a second flange projecting from the web portion.

11. The wiper seal pad assembly of claim 1, wherein the mounting member is operably coupled to a board that is bonded to the upper surface of the elongate pad.

12. The wiper seal pad assembly of claim 1, further comprising a base cover operably coupled to the mounting member and extending over the first side surface and the second side surface.

13. The wiper seal pad assembly of claim 12, further comprising a wear cover positioned outwardly from the base cover and extending over at least a portion of the first side surface and the second side surface, wherein the wear cover is configured to contact the exterior surface of the trailer as the trailer approaches a parked position at the loading dock.

14. The wiper seal pad assembly of claim 4, wherein the angle between the first side surface and the second side surface is from about 8° to about 15°.

15. The wiper seal pad assembly of claim 4, wherein the angle between the first side surface and the second side surface is from about 10° to about 13°.

16. The wiper seal pad assembly of claim 1, wherein the first side surface is perpendicular to a ground surface when the wiper seal pad assembly is not in contact with the trailer.

17. A wiper seal system for use with a loading dock having a head member positioned above a loading dock door, the wiper seal system comprising:
an elongate wiper pad, having—
an upper surface;
a first side surface extending downwardly from the upper surface, the first side surface configured to face outwardly from the loading dock and contact an exterior surface of a trailer positioned at the loading dock; and
a second side surface extending downwardly from the upper surface opposite the first side surface;
a mounting member operably coupled to an upper portion of at least one of the first side surface or the second side surface of the elongate wiper pad; and
a hanger bracket having a base, a flange extending upwardly from the base, and at least one tab extending downwardly from the base, wherein the flange is configured to be operably coupled to the head member of the loading dock and the at least one tab is operably coupled to the mounting member.

18. The wiper seal system of claim 17, wherein:
the mounting member is a first mounting member operably coupled to the upper portion of the first side surface of the elongate wiper pad,
the wiper seal system further comprises a second mounting member operably coupled to the upper portion of the second side surface of the elongate pad opposite the first mounting member,
the at least one tab is a first tab and the hanger bracket further includes a second tab extending downwardly from the base, and
the first tab is operably coupled to the first mounting member and the second tab is operably coupled to the second mounting member.

19. The wiper seal system of claim 17, wherein the head member further comprises a crossmember arranged perpendicular to the first side surface, and wherein the flange of the bracket is operably coupled to the crossmember.

20. The wiper seal system of claim 19, wherein the flange of the bracket is operably coupled to the crossmember by clinching the flange to the crossmember.

21. The wiper seal system of claim 19, wherein the flange further comprises a first ear portion and a second ear portion each extending laterally from the flange, and wherein the first and second ear portions are operably coupled to the crossmember by clinching the first and second ear portions to the crossmember.

22. The wiper seal system of claim 17, wherein the base of the hanger bracket is perpendicular to the tab, and wherein the tab has an aperture configured to receive a fastener to operably couple the mounting member to the hanger bracket.

23. A loading dock station at a loading facility, the loading dock station comprising:
a loading dock door;
a head frame positioned above the loading dock door and having at least one crossmember extending longitudinally and arranged perpendicularly to the loading dock door;
a hanger bracket having a flange operably coupled to the at least one crossmember of the head frame and a tab extending downwardly away from the crossmember; and
a wiper assembly having a mounting member operably coupled to—
the tab, and
an elongate wiper pad having an outward surface facing away from the loading dock door and an inward surface facing the loading dock door, wherein the outward surface is configured to interface with an exterior surface of a trailer positioned at the loading dock station.

24. The loading dock station of claim 23, wherein the inward surface is disposed at an angle from the outward surface such that the elongate wiper pad tapers away from the mounting member.

25. The loading dock station of claim 23, wherein the flange of the bracket is operably coupled to the crossmember by clinching the flange to the at least one crossmember.

26. The loading dock station of claim 23, wherein the flange further comprises a first ear portion and a second ear portion each extending laterally from the flange, and wherein the first and second ear portions are operably coupled to the crossmember by clinching the first and second ear portions to the crossmember.

27. The loading dock station of claim 23, wherein the tab of the hanger bracket is perpendicular to the flange, and wherein the tab has an aperture configured to receive a fastener to operably couple the mounting member to the flange.

28. The wiper seal pad assembly of claim 3, wherein the notch is inset from the at least one of the first side surface or the second side surface and the joint extends from the notch to the other of the first side surface or the second side surface.

29. The wiper seal pad assembly of claim 3, wherein the first pad portion comprises a first foam and the second pad portion comprises a second foam that is more resilient than the first foam.

30. The wiper seal pad assembly of claim 6, wherein the second side surface is disposed at an angle relative to the first side surface such that the elongate pad has a cross-sectional shape that tapers inwardly extending away from the upper surface.

* * * * *